March 5, 1963 K. SCHAEFER 3,079,836
SHUTTER STOPPING MEANS IN MOTION PICTURE CAMERAS
Filed Aug. 12, 1957 2 Sheets-Sheet 1
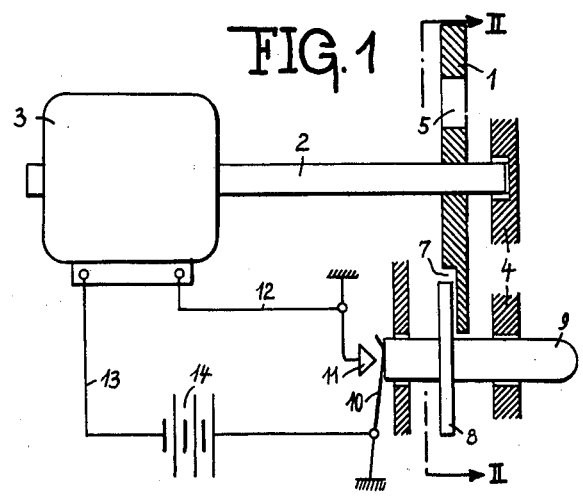
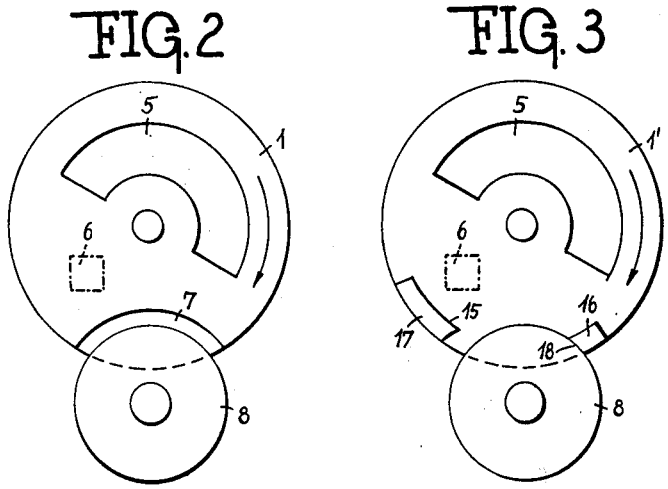
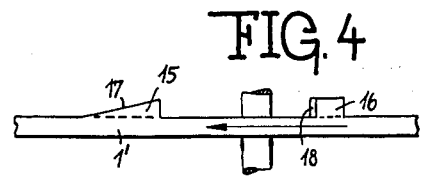
INVENTOR
KNUT SCHAEFER
BY Dicke and Craig.
ATTORNEYS.

March 5, 1963 K. SCHAEFER 3,079,836
SHUTTER STOPPING MEANS IN MOTION PICTURE CAMERAS
Filed Aug. 12, 1957 2 Sheets-Sheet 2

INVENTOR.
KNUT SCHAEFER
BY
Dicke & Craig
ATTORNEYS

United States Patent Office 3,079,836
Patented Mar. 5, 1963

3,079,836
SHUTTER STOPPING MEANS IN MOTION
PICTURE CAMERAS
Knut Schaefer, Gotthelfstrasse 65, Munich, Germany
Filed Aug. 12, 1957, Ser. No. 677,700
Claims priority, application Germany Aug. 13, 1956
6 Claims. (Cl. 88—16)

This invention is concerned with improvements in or relating to motion picture cameras and more particularly to the means for controlling the switching on and off of such cameras.

The majority of motion picture cameras available have the disadvantage, that the individual pictures of a scene are not always uniformly illuminated, in spite of the fact that during the exposures the lighting conditions do not change. If for example one compares the last picture with the preceding pictures of a scene, then it is found that the density of this picture differs from that of the others. In addition there is the fact that generally an area corresponding to a single picture and lying between two consecutively exposed scenes, is illuminated because the shutter upon conclusion of one scene was not properly closed, with the result that between two pictures which correspond to the two scenes, one picture remains black in the negative, and white in the positive.

It is an object of the invention to avoid the above described disadvantages.

In order to avoid the above mentioned disadvantage it is proposed according to the invention, to provide means in a motion picture camera, which effect a direct stopping and holding of the rotary shutter of the camera by the release means, which may for example, be a release button or knob.

According to the invention, I provide a motion picture camera comprising electrically operated driving means, manually operable release means operatively associated with the driving means, to selectively permit single exposures and a series of exposures to be made, a rotary shutter driven by said driving means and shutter locking means operable by said release means for directly stopping said shutter.

The release means may be provided with locking means such for example, as a disc which extends transversely to the direction of movement of the release means, whilst the rotary shutter has cooperating means, such for example as a recess, notch or cam surface, the arrangement being such that when the release means is in its position of rest, or is not urged into its operative position, the said disc will move into the path of movement of the cooperating means on the shutter, whereupon it serves to prevent the shutter swinging back against its normal direction of rotation.

It is preferable to provide two cams on the rotary shutter and to so shape the cam which during rotation first comes into contact with the release button disc, that it has a surface inclined to the plane of the rotary shutter, one edge of which surface lies in the plane of the rotary shutter, the said edge being on the side of the first cam remote from the second cam. In this latter arrangement the locking disc will engage in the recess between the two cams and the arrangement corresponds generally to that above mentioned where a recess is provided in the rotary shutter plate, which, viewed in the peripheral direction, is wider than the width of the release button disc where it engages the recess.

If desired, however, the release means may also be in the form of a lever, which serves to lock the rotary shutter plate of the camera in its position of rest or when it is in a condition uninfluenced by external forces. The lever can have a catch or the like thereon, which in locked condition of the rotary shutter plate, engages in a recess, notch or the like provided therein, the width of the recess, notch or the like being somewhat greater than the width of the catch.

The invention will now be described in more detail by reference to some embodiments by way of example shown diagrammatically in the accompanying drawings.

FIGURE 1 is a section through the front wall of a camera housing and shows the release means and the rotary shutter plate which can be directly locked by it, the motor driving the rotary shutter plate and the switch means influenced by the release means for switching the motor on or off.

FIGURE 2 is a section on the line II—II of FIGURE 1,

FIGURE 3 is a view similar to that of FIGURE 2, but shows a rotary shutter plate, which has two cams, FIGURE 4 is a side elevation of the shutter plate of FIGURE 3 and shows the two cams thereon.

Figure 5:
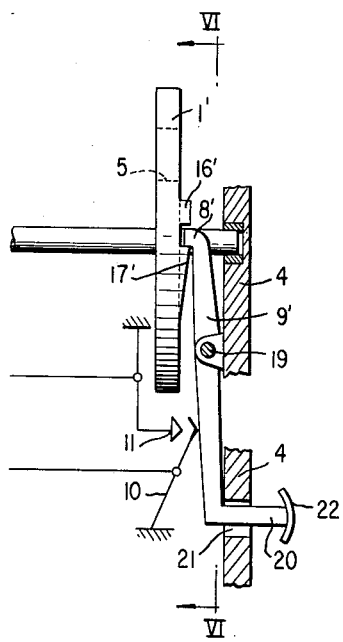
FIGURES 5 and 6 are views similar to FIGURES 1 and 2, respectively, but illustrating a further embodiment of the invention.

A rotary shutter 1 is mounted on a shaft 2, which is mounted for example at one end in the housing of a motor 3, and at the other end in a camera housing 4 and in this particular embodiment forms a single unit with the armature of the motor. The rotary shutter plate 1 can of course, also be driven by motor 3, by other means, for example by means of a gear wheel mounted on the motor axis and engaging teeth provided along the circumference of the rotary shutter plate 1. The rotary shutter plate 1 has for example a slot 5 extending therethrough, which upon rotation of the rotary shutter plate 1 exposes a picture window 6 of the objective of the camera, which is assumed to be on the side facing the observer. In the periphery of plate 1 a recess 7 is provided, in which a disc 8 of a release button 9, which is under the influence of one or more springs 10, can engage, if it is not under the influence of external forces or is in its position of rest. The spring or springs influencing the release button 9 can also serve as contact means for switching the motor 3 on or off. If the spring 10 contacts the contact 11, which is connected to the motor 3 by a lead 12, then the motor receives current, via a battery 14 provided in the circuit 13, and starts up and sets the rotary shutter plate 1 in rotation, since the disc 8 of the release means 9 then no longer engages in the recess 7, the release button 9 being then in its operative position. If one releases the release button 9, so that it returns under the influence of spring 10 to its position of rest, then not only is the supply of current to the motor 3 interrupted, but the rotary shutter plate 1 is stopped and the disc 8 engages in the recess 7.

Instead of a recess 7 I may also provide a recess defined between two cams 15, 16 (FIGS. 3 and 4). The cam 15 is so shaped, that it has an inclined surface 17, which when the release button 9 returns to its position of rest (as shown in FIGURE 1) under the influence of spring 10, causes the locking disc 8 of the release button 9 to engage behind the cam 15 and against the face 18 of cam 16. The intermediate space between the two cams 15, 16 and the inclination of the surface 17 are so chosen, that the disc 8 always remains between the two cams 15, 16, for as long as the button 9 is not operated.

Of course, I may also provide as release means differently shaped elements, such for example as a lever, which when in its rest position or when not under the influence of external forces, blocks the rotary shutter plate 1. The lever can have a catch or the like, which serves to engage in the recess, notch or the like provided for this purpose in the rotary shutter plate 1' in order to hold it in its locked position. The recess or notch will also be so dimensioned, that the release lever preferably under spring pressure can make proper engagement therewith. The catch of the lever can also be arranged to engage between two cams on the rotary shutter, e.g. between two cams corresponding to the cams 15, 16.

Figure 6:
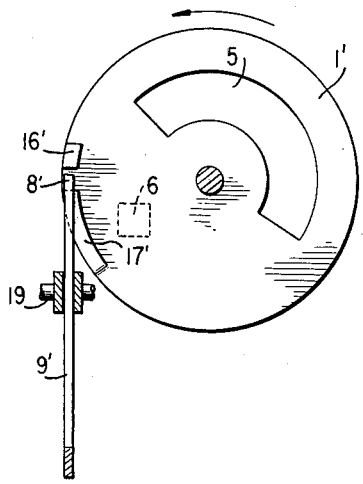

In the embodiment of FIGURES 5 and 6, the apparatus is generally similar to that previously described, but in place of the push button 9 there is substituted a lever 9' pivoted at the point 19 and having an extension 20 through an opening 21 in the wall of the camera and provided with a button 22 for manually actuating the lever. The lever 9' has a catch or projection 8' movable axially of the rotary shutter disk to and from the rest position within the axially-opening recess between the cams 15' and 16', which like the cams of previous embodiments lie within the periphery of the shutter disk. The operation of this embodiment will be similar to that previously mentioned in connection with FIGURES 1 through 4 in response to depression of the button 22 against the bias of contact spring 10.

According to each of the aforementioned embodiments of the invention, there is an axially-opening recess in the rotary shutter defined by opposed surfaces which are engageable with locking means movable axially of the shutter, such as the disk 8 of the release apparatus, and so arranged with respect to the locking means that one of the surfaces is engageable with the locking means to block forward rotation of the shutter when it is at rest or to interrupt forward rotation at the conclusion of an exposure; whereas the other surface is effective, once the forward rotation is blocked, to block the shutter against rotation in the opposite direction, i.e., the shutter is substantially prevented from bouncing in the return direction when its forward movement is abruptly interrupted.

I claim:

1. A motion picture camera comprising driving means, a rotary shutter driven by said driving means including two cams arranged in the same path of motion and forming a recess therebetween, manually operable release means movable between a position of rest and a position of operation, locking means on said release means projecting into said recess between said cams with said release means in said position of rest, said cams having opposed surfaces forming the walls of said recess, one of said surfaces being engageable with said locking means to block normal forward rotation of said shutter, the other surface being so positioned with respect to said first surface and the locking means to block the shutter from swinging back in the opposite direction upon interruption of forward rotation of the shutter by engagement of said one surface with said locking means, and spring means for urging said release means into said position of rest to thereby enable the selective taking of exposures to be made, said manually operable release means including a release knob axially movable into and out of the camera between an operative position and a position of rest, said locking means including a locking disc extending transversely with respect to the axis of movement of said knob, the two cams of said rotary shutter being peripherally spaced thereon, the cam of said two cams which during rotation of the shutter first contacts said locking disc being provided with a surface inclined to the surface of said shutter, and said inclined surface having one edge lying in the plane of the shutter so as to cause said locking disc to pass thereover and engage between said two cams upon movement of the release means to the rest position thereof.

2. A motion picture camera comprising electrically-operated driving means, switch means for selectively operating said driving means, a rotary shutter driven by said driving means about the axis of rotation thereof and having at least one axially-opening recess provided on the face thereof and within the periphery of said shutter, manually-operable release means consisting of a single lever operatively connected with said switch means and movable between a position of rest and a position of operation, a locking portion on said lever overlying the periphery of said shutter, and means pivotally supporting said lever about an axis substantially perpendicular to the axis of said shutter so that said locking portion is adapted to be pivoted in a direction substantially perpendicular to the face of said shutter to project into said recess with said lever in said position of rest, said shutter having opposed abutment surfaces defining the sides of said recess and engageable with said locking portion to thereby respectively lock said shutter against movement in opposite directions of rotation, one of said abutment surfaces being engageable with said locking portion to interrupt forward movement of the shutter and the other surface being so positioned with respect to said locking portion as to block the shutter from swinging oppositely with respect to said forward direction of rotation upon engagement of said locking portion and said one surface, and means normally urging said lever into said position of rest to thereby enable the selective taking of exposures and also normally open said switch means and cause engagement of said locking portion in said recess.

3. A motion picture camera comprising driving means, a rotary shutter driven by said driving means and having at least one axially-opening recess provided on the face of the shutter within the periphery of said shutter, a single manually-operable release member having an axial direction substantially perpendicular to the face of said shutter and movable in the said axial direction thereof between a position of rest and a position of operation, said release member being provided with a locking portion overlying the periphery of said shutter and axially projecting directly into said recess on the shutter with said release member axially moved into said position of rest, said shutter having opposed abutment surfaces defining the sides of said recess and engageable with said locking portion to thereby respectively lock said shutter against movement in opposite directions of rotation, one of said abutment surfaces being engageable with said locking portion to interrupt forward movement of the shutter and the other surface being so positioned with respect to said locking portion as to block the shutter from swinging oppositely with respect to said forward direction of rotation upon engagement of said locking portion and said one surface, and spring means for urging said release member in the axial direction thereof into said position of rest to thereby enable the selective taking of exposures.

4. A motion picture camera comprising electrically-operable driving means, a rotary shutter driven by said driving means including two cams arranged on the face of said shutter in the same path of motion and forming a recess therebetween, manually-operable release means having an axial direction substantially perpendicular to the face of the shutter and movable in the said axial direction thereof between a position of rest and a position of operation, locking means on said release means for movement in unison therewith in the said axial direction and axially projecting into said recess between said cams with said release means in said position of rest, said cams having opposed abutment surfaces forming the walls of said recess, one of said surfaces being engageable with said locking means to block normal forward rotation of said shutter, the other surface being so positioned with respect to said first surface and the locking means to block the shutter from swinging back in the opposite direction upon interruption of forward rotation of the shutter by engagement of said one surface with said locking means, spring means for urging said release means into said position of rest to thereby enable the selective taking of exposures to be made, and contact means for said driving means, said contact means being in abutting engagement with said release means for closing an electrical circuit for said driving means upon manual operation of said release means from the position of rest into the position of operation thereof.

5. A motion picture camera comprising electrically-operated driving means, a rotary shutter driven by said driving means including two cams arranged in the same path of motion and forming a recess therebetween, manually-operable release means movable between a position of rest and a position of operation, locking means on said release means projecting into said recess between said cams with said release means in said position of rest, said manually-operable release means including a single release member integral with said locking means, said cams having opposed stop surfaces forming the walls of said recess, one of said stop surfaces being engageable with said locking means to block normal forward rotation of said shutter, the other surface being so positioned with respect ot said first surface and the locking means to block the shutter from swinging back in the opposite direction upon interruption of forward rotation of the shutter by engagement of said one surface with said locking means, spring means for urging said release means into said position of rest to thereby enable the selective taking of exposures to be made, and contact means for said driving means, said contact means being in abutting engagement with said release means for closing an electrical circuit for said driving means upon manual operation of said release means, said spring means being part of said contact means.

6. A motion picture camera comprising electrically-operable driving means including an electrical energizing circuit therefor provided with contact means, a rotary shutter driven by said driving means including two cams arranged on the face of said shutter in the same path of motion and forming a recess therebetween, a single manually-operable release member having an axial direction substantially perpendicular to the face of said shutter and movable in the said axial direction between a position of rest and a position of operation, locking means on said release member axially projecting into said recess between said cams with said release member in said position of rest, said cams having opposed abutment surfaces forming the walls of said recess, one of said abutment surfaces being engageable with said locking means to block normal forward rotation of said shutter, the other surface being so positioned with respect to said first surface and said locking means to block the shutter from swinging back in the opposite direction upon interruption of forward rotation of the shutter by engagement of said one surface with said locking means, and spring means for urging said release member in said axial direction into said position of rest to thereby enable the selective taking of exposures, said contact means being in abutting engagement with said release member for closing the electrical energizing circuit for said driving means upon manual operation of said release member from the position of rest to the position of operation thereof.

References Cited in the file of this patent

UNITED STATES PATENTS

| | | |
|---|---|---|
| 2,198,417 | Scheibell | Apr. 23, 1940 |
| 2,462,302 | Bolsey | Feb. 22, 1949 |
| 2,476,576 | Bachelder | July 19, 1949 |

FOREIGN PATENTS

| | | |
|---|---|---|
| 105,467 | Great Britain | Apr. 19, 1917 |
| 499,728 | Great Britain | Jan. 27, 1939 |